United States Patent
Matsumoto et al.

(10) Patent No.: US 6,606,136 B2
(45) Date of Patent: Aug. 12, 2003

(54) IODINE-TYPE POLARIZING PLATE ENABLES NEUTRAL WHITE IN WHITE DISPLAY AND NEUTRAL BLACK IN BLACK DISPLAY

(75) Inventors: Koji Matsumoto, Niihama (JP); Narutoshi Hayashi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 120 days.

(21) Appl. No.: 09/949,641

(22) Filed: Sep. 12, 2001

(65) Prior Publication Data

US 2002/0063243 A1 May 30, 2002

(30) Foreign Application Priority Data

Sep. 21, 2000 (JP) .......... 2000-286895

(51) Int. Cl.$^7$ .......... G02F 1/1335; G02B 27/28; B29D 7/01
(52) U.S. Cl. .......... 349/96; 349/96; 359/485; 359/491; 264/1.35
(58) Field of Search .......... 349/96; 359/485, 359/491; 264/1.31, 1.34, 1.35; 252/585

(56) References Cited

U.S. PATENT DOCUMENTS 5,071,906 A * 12/1991 Tanaka et al. .......... 524/557
5,926,310 A    7/1999 Tamura et al. .......... 359/350

FOREIGN PATENT DOCUMENTS

| JP | 61-032005 A | * | 2/1986 |
| JP | 08-304624 |   | 11/1996 |
| JP | 10-090517 A | * | 4/1998 |
| JP | 11-281817 |   | 10/1999 |
| JP | 2000-035512 A | * | 2/2000 |
| JP | 2001-83328 |   | 3/2001 |
| JP | 2001-083329 A | * | 3/2001 |
| JP | 2001-166143 A | * | 6/2001 |

* cited by examiner

Primary Examiner—Tarifur R. Chowdhury
(74) Attorney, Agent, or Firm—Sughrue Mion, PLLC

(57) ABSTRACT

A polarizing plate comprising a uniaxial stretched polyvinyl alcohol resin film with iodine adsorbed thereto in an oriented state and a protection film bonded to at least one surface of the resin film. The polarizing plate has a single transmittance of about 42.5% or more, a degree of polarization of about 99% or more, and a neutral coefficient Np of 0 to about 4 which is calculated from expression (I), and the polarizing plate also satisfies the relationship represented by expression (II);

$$Np = |\sqrt{(Pa^*)^2+(Pb^*)^2} - \sqrt{(Qa^*)^2+(Qb^*)^2}| \quad (I)$$

wherein Pa*, Pb*, Qb*, and Qa* respectively denote a* and b* in a parallel hue and a* and b* in a perpendicular hue in L*a*b* color system;

$$\sqrt{(Pa^*)^2+(Pb^*)^2} < 4.5 \quad (II).$$

The resultant polarizing plate enables neutral white in the case of white display and neutral black in the case of black display, bright white display, and high-contrast display.

5 Claims, 1 Drawing Sheet

IODINE-TYPE POLARIZING PLATE ENABLES NEUTRAL WHITE IN WHITE DISPLAY AND NEUTRAL BLACK IN BLACK DISPLAY

BACKGROUND OF THE INVENTION

1. Field of the Invention

The present invention relates to an iodine-type polarizing plate comprising a uniaxial stretched polyvinyl alcohol resin film with iodine adsorbed thereto in an oriented state and a protection film bonded to at least one surface of the resin film.

2. Description of the Related Art

A polarizing film made of a polyvinyl alcohol resin film with a dichromatic substance adsorbed thereto in an oriented state is used as one of members of a liquid crystal display device, normally in the form of a polarizing plate with a protection film bonded to at least one surface of the polarizing film. The conventional polarizing plate however has a problem as follows. When the polarizing plate is used for a liquid crystal display device, in particular, for a reflective liquid crystal display device, a screen of a liquid crystal display appears yellowish in the case of white display. To solve this problem, Japanese Laid-Open Patent Publication No. 8-304624, for example, discloses that coloring of the screen in the case of white display can be suppressed by changing the shape of a transmission spectrum of the polarizing plate.

However, the polarizing plate disclosed in the above publication is low in degree of polarization compared with generally used polarizing plates, and exhibits bluish hue of the screen in the case of black display. Therefore, a liquid crystal display screen using such a polarizing plate has problems of being low in contrast and having bluish hue in the case of black display. In recent years, various types of color reflective liquid crystal display devices have been realized at rapid paces. Under these circumstances, it is demanded to develop a polarizing plate that dose not provide yellowish hue of the screen in the case of white display and bluish hue of the screen in the case of black display, and enables high-contrast display.

Hereinafter, a hue, which is not yellowish and is white as it is called, is referred to neutral white, and a hue, which is not bluish and is black as it is called, is referred to neutral black.

The present inventors have earnestly studied in order to develop a polarizing plate enabling neutral white in the case of white display and neutral black in the case of black display, bright white display, and high-contrast display, and found that an iodine-type polarizing plate satisfying condition as described herein could provide the intended performance. That is, the iodine-type polarizing plate, which is a polarizing plate using iodine as the dichromatic substance, have a single transmittance of about 42.5% or more, a degree of polarization of about 99% or more, coefficients, calculated from a hue in the parallel state and a hue in the perpendicular state in L*a*b* color system, are within a range as described herein. The present invention is based on these findings.

The hue in the parallel state as used herein is a hue when two polarizing plates layered one upon the other so that their absorption axes match with each other are irradiated with natural light (non-polarized light). This hue is hereinafter referred to a "parallel hue". The hue in the perpendicular state as used herein is a hue obtained when two polarizing plates layered one upon the other so that their absorption axes perpendicular each other at right angles are irradiated with natural light (non-polarized light). This hue is hereinafter referred to a "perpendicular hue"

SUMMARY OF THE INVENTION

An object of the present invention is to provide a polarizing plate that enables neutral white in the case of white display and neutral black in the case of black display, bright white display, and high-contrast display.

The present invention provides an iodine-type polarizing plate comprising a uniaxial stretched polyvinyl alcohol resin film with iodine adsorbed thereto in an oriented state and a protection film bonded to at least one surface of the resin film, wherein the polarizing plate has a single transmittance of about 42.5% or more, a degree of polarization of about 99% or more, and a neutral coefficient Np of 0 to about 4 which is calculated from the following expression (I), and the polarizing plate satisfies the relationship represented by the following expression (II);

$$Np = |\sqrt{(Pa^*)^2 + (Pb^*)^2} - \sqrt{(Qa^*)^2 + (Qb^*)^2}| \qquad (II)$$

wherein Pa*, Pb*, Qa*, and Qb* respectively denote a* and b* in a parallel hue and a* and b* in a perpendicular hue in L*a*b* color system;

$$\sqrt{(Pa^*)^2 + (Pb^*)^2} < 4.5 \qquad (II)$$

DESCRIPTION OF PREFERRED EMBODIMENTS

Figure 1:
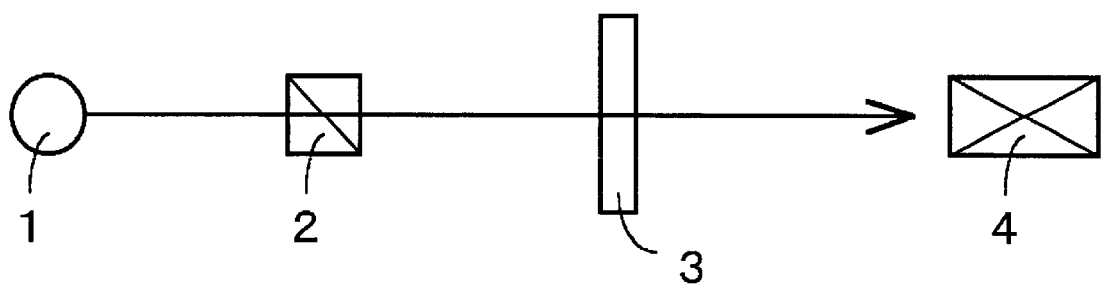
FIG. 1 is a schematic view of an example of an apparatus used for measurement of transmittance.

The polarizing plate of the present invention is a polarizing plate comprising an iodine-type polarizing film made of a uniaxial stretched polyvinyl alcohol resin film with iodine adsorbed thereto in an oriented state and a protection film bonded to at least one surface of the polarizing film. The polyvinyl alcohol resin constituting the polarizing film is normally prepared by saponifying a polyvinyl acetate resin. Examples of polyvinyl acetate resins include polyvinyl acetate as a homopolymer of vinyl acetate and copolymers of vinyl acetate and other monomers copolymerizable with vinyl acetate. Examples of the other monomers copolymerizable with vinyl acetate include unsaturated carboxylic acids, olefins, vinyl ethers, and unsaturated sulfonic acids.

The degree of saponification of the polyvinyl alcohol resin is normally in the range of about 85 to about 100 mol %, preferably in the range of about 98 to about 100 mol %. The polyvinyl alcohol resin may be denatured. For example, polyvinyl formal, polyvinyl acetal, or the like obtained by denaturing the polyvinyl alcohol resin with an aldehyde may be used. The degree of polymerization of the polyvinyl alcohol resin is normally in the range of about 1,000 to about 10,000, preferably in the range of about 1,500 to about 10,000.

The iodine-type polarizing plate is normally manufactured by a series of processes of: uniaxially stretching a polyvinyl alcohol resin film as described above; dyeing the polyvinyl alcohol resin film with iodine to allow the iodine to be adsorbed to the film; treating the iodine-adsorbed polyvinyl alcohol resin film with an aqueous boric acid solution; washing the polyvinyl alcohol resin film with water after the treatment with the aqueous boric acid solution; and bonding a protection film to at least one surface of the uniaxial stretched polyvinyl alcohol resin film with iodine adsorbed thereto in an oriented state as a result of the above processes. The uniaxial stretching may be performed before, during, or after dyeing with iodine. When performed after dyeing with iodine, the uniaxial stretching may be before or during the treatment with boric acid. The uniaxial stretching may also be performed over these plural processes. The film may be uniaxially stretched between rolls having different peripheral speeds, or stretched using thermal rolls. Alternatively, dry stretching in the air or wet stretching in the swelling state with a solvent may be adopted. The film is normally stretched to about four to about eight times of the original size.

Adsorption of iodine to the polyvinyl alcohol resin film in an oriented state is normally realized by immersing the polyvinyl alcohol resin film in an aqueous solution containing iodine and potassium iodide to dye the resin film with iodine. This aqueous solution normally contains iodine in an amount of about 0.01 to about 0.5 parts by weight and potassium iodide in an amount of about 0.5 to about 10 parts by weight, per 100 parts by weight of water. The temperature of the aqueous solution is normally about 20 to about 40° C. The immersing time of the resin film in the aqueous solution is normally about 30 to about 300 seconds.

The boric acid treatment after dyeing with iodine is performed by immersing the iodine-dyed polyvinyl alcohol resin film in an aqueous boric acid solution. The aqueous boric acid solution normally contains boric acid in an amount of about 2 to about 15 parts by weight, preferably about 5 to about 12 parts by weight, per 100 parts by weight of water. The aqueous boric acid solution preferably contains potassium iodide. The immersing time of the resin film in the aqueous boric acid solution is normally about 100 to about 1,200 seconds, preferably about 150 to about 600 seconds, more preferably about 200 to about 400 seconds.

The boric acid-treated polyvinyl alcohol resin film is normally washed with water. This washing, for example, is performed on immersing the boric acid-treated polyvinyl alcohol resin film in water. After the washing with water, the resin film is dried, to obtain the polyvinyl alcohol resin film with iodine adsorbed thereto in an oriented state, that is, the iodine-type polarizing film.

A protection film is bonded to one surface or both surfaces of the thus-obtained polarizing film as is normally done, to complete the polarizing plate. Examples of the protection film include cellulose acetate resin films such as triacetyl cellulose and diacetyl cellulose, acrylic resin films, polyester resin films, polyarylate resin films, polyether sulfone resin films, and cyclic polyolefin resin films such as polynorbornene resin films. The thickness of the protection film is normally about 30 to about 200 µm. The protection film may contain an ultraviolet absorbent such as a triazole absorbent or a benzophenone absorbent. Such an absorbent is added in an amount with which the transmittance of the protection film alone for the wavelength of 380 nm is reduced to about 10% or less. Although the polarizing plate of the present invention is more easily attained using a protection film containing no ultraviolet absorbent, the use of a protection film containing an ultraviolet absorbent is more preferred at least for application as a front polarizing plate of a liquid crystal display device.

The polarizing film and the protection film are normally bonded together with a transparent, optically isotropic adhesive. As such an adhesive, a polyvinyl alcohol adhesive, for example, may be used. In normal, an adhesive is dissolved in a solvent when used. Therefore, in the bonding of the polarizing film and the protection film with the adhesive, drying is required to remove the solvent. When a polyvinyl alcohol adhesive described above is used, the solvent is normally water or a mixture of water and a hydrophilic organic solvent. The solvent is normally removed by hot-blast drying. To attain the polarizing plate of the present invention, the temperature is preferably about 70° C. or less for at least a half of the drying time. Within this temperature range, a lower drying temperature is more preferable. However, if the drying is insufficient, the solvent in the adhesive fails to vapor sufficiently, possibly causing a trouble in a subsequent process. Therefore, the temperature of a drying oven should be selected so that the water content of the polarizing plate immediately after the drying is about 4% by weight or less, preferably about 3.8% by weight or less. The drying may be done by keeping a certain temperature, or may be done in a plurality of drying ovens having different temperatures. In the former case, the temperature of the drying oven is set at about 70° C. or less. In the latter case, the temperature may exceed about 70° C. in a drying oven as long as the temperature is about 70° C. or less for at least a half of the total drying time when the bonded film passes through the plurality of drying ovens. The drying time is normally in the range of about 20 to about 1,200 seconds. In the case of using a plurality of drying ovens, the total drying time may be within this range.

The resultant polarizing plate may have a hard coat layer, an antireflection layer, an antiglare layer, and the like. In normal, the adhesive is applied to at least one surface of the polarizing plate.

As described above, iodine is adsorbed to the uniaxial stretched polyvinyl alcohol resin film in an oriented state, and the protection film is bonded to at least one surface of the resin film, to obtain the iodine-type polarizing plate. The polarizing plate of this invention has a single transmittance of about 42.5% or more and a degree of polarization of about 99% or more. In addition, the neutral coefficient Np is in the range of 0 to about 4, which is calculated from expression (I) above using $a^*$ and $b^*$ in the parallel hue ($Pa^*$ and $Pb^*$) and $a^*$ and $b^*$ in the perpendicular hue ($Qa^*$ and $Qb^*$) in $L^*a^*b^*$ color system determined according to JIS Z 8729. Also, $a^*$ and $b^*$ in the parallel hue ($Pa^*$ and $Pb^*$) satisfy expression (II) above. For bright display, the single transmittance is preferably about 43% or more, more preferably about 43.5% or more. The degree of polarization is preferably as high as possible. Specifically, it is preferably about 99.5% or more, more preferably about 99.8% or more.

In $L^*a^*b^*$ color system, the hue becomes neutral white and neutral black as $a^*$ and $b^*$ are closer to zero. The method of color specification ($L^*a^*b^*$ color system) described in JIS Z 8729 corresponds to the method of color specification described in Publication CIE No. 15.2 (1986), Colorimetry, Second Edition, 4 issued by Commission Internationale de l'Eclairage (CIE).

When the polarizing plate of which the neutral coefficient calculated from expression (I) is in the range of 0 to about 4 is used for a liquid crystal display device, neutral white in the case of white display and neutral black in the case of black display are obtained, and visibility become better, compared with the case of using the conventional polarizing plate. As is found from expression (I), the neutral coefficient Np is smaller as both $a^*$ and $b^*$ in the parallel hue ($Pa^*$ and $Pb^*$) and $a^*$ and $b^*$ in the perpendicular hue ($Qa^*$ and $Qb^*$) are smaller. A smaller neutral coefficient Np is also obtained when the absolute of $a^*$ in the parallel hue ($Pa^*$) is closer to the absolute of either one of $a^*$ in the perpendicular hue ($Qa^*$) and $b^*$ in the perpendicular hue ($Qb^*$), and also the absolute of $b^*$ in the parallel hue ($Pb^*$) is closer to the absolute of the other of $a^*$ in the perpendicular hue ($Qa^*$) and $b^*$ in the perpendicular hue ($Qb^*$), for example. The neutral coefficient Np is preferably as small as possible. For example, it is preferably about 3 or less, more preferably about 2 or less.

In general, whichever the parallel hue or the perpendicular hue, $a^*$ easily becomes closer to zero, while the absolute of $b^*$ easily varies. As both $b^*$ in the parallel hue ($Pb^*$) and $b^*$ in the perpendicular hue ($Qb^*$) are closer to zero, neutral white in the case of white display and neutral black in the case of black display are obtained. In view of this, it is necessary that a* in the parallel hue (Pa*) and b* in the parallel hue (Pb*) satisfy expression (II), that is, the value of $[(Pb^*)^2+(Pb^*)^2]^{0.5}$ is smaller than about 4.5.

According to a survey conducted by the present inventors, all of polarizing plates currently available in the market have a neutral coefficient Np exceeding about 4. Preferable conditions in order to reduce the neutral coefficient Np to about 4 or less are explained as follows.

For example, potassium iodide is added to the aqueous boric acid solution used for boric acid treatment after the dyeing with iodine, in an amount of about 5 parts by weight or more per 100 parts by weight of water. Also, in the bonding of the iodine-adsorbed uniaxial stretched polyvinyl alcohol resin film and the protection film, the bonded film is dried so that the temperature is about 70° C. or less for at least a half of the drying time.

The above conditions will be described in detail. In the boric acid treatment of the iodine-dyed polyvinyl alcohol resin film, the aqueous boric acid solution used for this treatment preferably contains potassium iodide in an amount of about 5 parts by weight or more per 100 parts by weight of water. The amount of potassium iodide in the aqueous boric acid solution is preferably about 5 to about 20 parts by weight, more preferably about 6 to about 18 parts by weight. If the concentration of potassium iodide in the aqueous boric acid solution is excessively low, the perpendicular hue of the resultant polarizing plate is not easily made neutral black.

For manufacture of a polarizing plate having a small neutral coefficient Np, the temperature for the drying after the bonding of the iodine-adsorbed uniaxial stretched polyvinyl alcohol resin film (polarizing film) and the protection film with an adhesive is important. If the drying temperature is excessively high, the value of b* in the parallel hue (Pb*) is too large to attain the polarizing plate of the present invention. In view of this, the bonded film is dried at a temperature of about 70° C. or less for at least a half of the total drying time.

Although the conditions on the composition of the boric acid treatment solution and the drying in the bonding of the protection film as described above are preferably used, further one, or two or more in combination, of the conditions (1) to (4) below is preferably adopted.

(1) The treatment of the iodine-dyed polyvinyl alcohol resin film with the aqueous boric acid solution is performed at a temperature of about 70° C. or more.

(2) The water washing after the boric acid treatment is performed at a temperature of about 20° C. or more.

(3) The drying after the water washing after the boric acid treatment is performed at a temperature of about 80° C. or less.

(4) The drying in the bonding of the protection film to the iodine-adsorbed uniaxial stretched polyvinyl alcohol resin film is performed for about 60 seconds or more.

The above conditions are described in more detail. The temperature during the boric acid treatment performed after the dyeing with iodine is also important. The temperature of the aqueous boric acid solution is preferably about 70° C. or more, for manufacture of a high-contrast polarizing plate having a transmittance of about 42.5% or more, preferably about 43% or more, more preferably about 43.5% or more and the degree of polarization of about 99% or more, preferably about 99.5% or more, more preferably about 99.8% or more, as the polarizing plate of the present invention. The temperature is more preferably in the range of about 71° C. to about 85° C.

The water washing after the boric acid treatment is appropriately performed at a temperature of about 20° C. or more, preferably at a temperature in the range of about 20° C. to about 50° C. As described above, this water washing is realized by immersing the boric acid-treated polyvinyl alcohol resin film in water. The immersing time is normally about 2 to about 120 seconds. The optimum water washing conditions for attaining the polarizing plate of the present invention should be determined on an as-needed basis because they are influenced by the intensity of the water stream and the like. If the water washing conditions are intense, that is, if the temperature of the water is too high or the water stream is too intense, the perpendicular hue of the polarizing plate fails to be neutral black. On the contrary, if the water washing conditions are mild, that is, if the temperature of the water is too low or the water stream is too mild, the parallel hue of the polarizing plate fails to be neutral white.

Drying follows the water washing. The temperature during the drying is appropriately about 80° C. or less, preferably about 40° C. to about 70° C. If the drying temperature is high, it is difficult to obtain a polarizing plate of which the parallel hue is neutral white. The drying time is normally about 120 to about 600 seconds.

In the bonding of the protection film to the iodine-adsorbed uniaxial stretched polyvinyl alcohol resin film (polarizing film) via an adhesive, the adhesive is normally dissolved in a solvent when used, as described above. Therefore, after the bonding of the protection film via the adhesive, the bonded film must be dried to remove the solvent. As the drying time, about 60 seconds or more is appropriate. Generally, drying up to about 1,200 seconds is enough. The drying time is therefore preferably about 60 to about 300 seconds.

As a combination of the above conditions is varied depending on a uniaxial stretched polyvinyl alcohol resin film, conditions used or the like, conditions for producing a polarizing plate of the present invention are set by carrying out preliminary experiments under above various conditions.

When the polarizing plate of the present invention is used as a front polarizing plate for a liquid crystal display device, the single transmittance for the wavelength of 380 nm is preferably as small as about 1% or less. For example, the single transmittance for the wavelength of 380 nm can be reduced by adding an ultraviolet absorbent to the protection film bonded to at least one surface of the polarizing film, as described above. Specifically, by using an ultraviolet absorbent-contained protection film having a transmittance for 380 nm of about 10% or less, the polarizing film with this protection film bonded thereto can have a single transmittance for 380 nm as small as about 1% or less. In general, when a protection film containing an ultraviolet absorbent is used, the parallel hue of the resultant polarizing plate tends to be yellowish and thus the neutral coefficient Np as defined herein tends to be large. However, it is possible to obtain a sufficiently small neutral coefficient Np even in this case by using the above methods.

As described above, the parallel hue and the perpendicular hue constituting expression (I) respectively refer to a hue obtained when two polarizing plates layered one upon the other so that their absorption axes match with each other are irradiated with natural light, and a hue obtained when two polarizing plates layered one upon the other so that their absorption axes perpendicular each other at right angles are irradiated with natural light. It is troublesome to layer two polarizing plates one upon the other so that their absorption axes precisely match with each other or they perpendicular each other precisely at right angles. Fine adjustment of the axes is difficult and the measurement requires a considerable time. In practice, therefore, it is customary to use one polarizing plate that is irradiated with linearly polarized light, measure a spectral transmittance of the polarizing plate, and calculate the parallel hue and the perpendicular hue from the measured value according to JIS Z 8729.

An example of the above measuring method will be described. Using a measuring system as shown in FIG. 1, light having a predetermined wavelength λ emitted from a light source (spectophotometer) 1 is changed to linearly polarized light by a polarizing prism 2, and the linearly polarized light is incident on a polarizing plate 3 as a sample. The light passed through the polarizing plate 3 is detected by a detector 4 to measure the spectral transmittance of the polarizing plate 3. Specifically, first, the polarizing plate is irradiated with linearly polarized light having a wavelength λ in the direction parallel with the absorption axis of the polarizing plate, and the spectral transmittance $k_1(\lambda)$ of the polarizing plate at this time is measured. Next, the polarizing plate is irradiated with linearly polarized light having a wavelength λ in the direction vertical to the absorption axis of the polarizing plate, and the spectral transmittance $k_2(\lambda)$ of the polarizing plate at this time is measured. These measurements are performed over a range of continuous wavelengths or at predetermined wavelength intervals. From the measured values, a parallel spectral transmittance $Tp(\lambda)$ and a perpendicular spectral transmittance $Tc(\lambda)$ for each wavelength λ are calculated from expressions (III) and (IV) below.

$$Tp(\lambda)(\%)=[\{(k_1(\lambda)(\%)/100)^2+(k_2(\lambda)(\%)/100)^2\}/2]\times100= [\{k_1(\lambda)(\%)\}^2+\{k_2(\lambda)(\%)\}^2]/200 \quad (III)$$

$$Tc(\lambda)(\%)=[\{(k_1(\lambda)(\%)/100)\times(k_2(\lambda)(\%)/100)+(k_2(\lambda)(\%)/100)\times (k_1(\lambda)(\%)/100)\}/2]\times100=\{k_1(\lambda)(\%)\}\times\{k_2(\lambda)(\%)\}/100 \quad (IV)$$

From the thus-obtained parallel spectral transmittance $Tp(\lambda)$ and perpendicular spectral transmittance $Tc(\lambda)$, a* and b* in the parallel hue and a* and b* in the perpendicular hue are calculated according to JIS Z 8729.

A single transmittance Ty of the polarizing plate is obtained by measuring spectral transmittances $\tau(\lambda)$ at predetermined wavelength intervals dλ, for example, at every 10 nm, over a wavelength range of 400 to 700 nm and calculating from expression (V) below using the measured spectral transmittances. According to the present invention, the thus-obtained single transmittance Ty is about 42.5% or more, preferably about 43% or more, more preferably about 43.5% or more.

$$Ty\,(\%) = \frac{\int_{400}^{700} P(\lambda)\cdot y(\lambda)\cdot \tau(\lambda)\cdot d\lambda}{\int_{400}^{700} P(\lambda)\cdot y(\lambda)\cdot d\lambda} \times 100 \quad (V)$$

wherein $P(\lambda)$ denotes the spectral distribution of CIE standard illuminants (C) and $y(\lambda)$ denotes color matching function of CIE 1931 standard colorimetric system. The spectral transmittance $\tau(\lambda)$ for a wavelength λ can be obtained from expression (VI) below using the spectral transmittance $k_1(\lambda)$ measured by irradiating the polarizing plate with linearly polarized light in parallel with the absorption axis of the polarizing plate and the spectral transmittance $k_2(\lambda)$ measured by irradiating the polarizing plate with linearly polarized light vertical to the absorption axis of the polarizing plate described above.

$$\tau(\lambda)=[\{k_1(\lambda)(\%)/100\}+\{k_2(\lambda)(\%)/100\}]/2 \quad (VI)$$

The single transmittance Ty refers to the transmittance of one polarizing plate. The transmittance of two polarizing plates layered one upon the other so that their absorption axes match with each other is called a parallel transmittance Tp, while the transmittance of two polarizing plates layered one upon the other so that their absorption axes perpendicular each other at right angles is called a perpendicular transmittance Tc. The parallel transmittance Tp and the perpendicular transmittance Tc can be calculated from expressions (VII) and (VIII) below using the parallel spectral transmittance $Tp(\lambda)$ obtained from expression (III) and the perpendicular spectral transmittance $Tc(\lambda)$ obtained from expression (IV), respectively.

$$Tp\,(\%) = \frac{\int_{400}^{700} P(\lambda)\cdot y(\lambda)\cdot \{Tp(\lambda)(\%)/100\}\cdot d\lambda}{\int_{400}^{700} P(\lambda)\cdot y(\lambda)\cdot d\lambda} \times 100 \quad (VII)$$

$$Tc\,(\%) = \frac{\int_{400}^{700} P(\lambda)\cdot y(\lambda)\cdot \{Tc(\lambda)(\%)/100\}\cdot d\lambda}{\int_{400}^{700} P(\lambda)\cdot y(\lambda)\cdot d\lambda} \times 100 \quad (VII)$$

A degree of polarization Py is calculated from expression (IX) below using the parallel transmittance Tp and the perpendicular transmittance Tc obtained as described above. According to the present invention, the degree of polarization is about 99% or more, preferably about 99.5% or more, more preferably about 99.8% or more.

$$Py\,(\%) = \sqrt{\frac{Tp-Tc}{Tp+Tc}} \times 100 \quad (IX)$$

Normally, the manufacturing conditions described above can be appropriately combined so that both the single transmittance and the degree of polarization of the polarizing plate fall within the values defined in the present invention. The single transmittance and the degree of polarization of the polarizing plate, the neutral coefficient Np calculated from expression (I), and $[(Pb^*)^2+(Pb^*)^2]^{0.5}$ as the basis of expression (II) can vary depending on various conditions. In general, therefore, it is possible to set conditions for obtaining the values defined in the present invention by carrying out simple preliminary experiments.

When the polarizing plate of the present invention is used for a liquid crystal display device (of a TN mode, a STN mode, a field sequential mode, or the like), neutral white in the case of white display and neutral black in the case of black display can be obtained. In particular, when the polarizing plate is used for a color liquid crystal display device, color purity is improved.

EXAMPLE

Hereinafter, the present invention will be described in more detail by way of example. Note that the present invention is by no means restricted by the following examples.

First, evaluation performed for the polarizing plate will be described.

(1) Measurement of transmittance and Calculation of neutral coefficient Np and the like First, a polarizing prism was placed in a commercially available ultraviolet and visible spectrophotometer (UV-2200 manufactured by Shimadzu Corp.), to establish an apparatus capable of measuring the transmittance for linearly polarized light. This measuring system has a construction shown in FIG. 1 described above.

The transmittances are measured when the polarizing plate 3 is positioned so that the absorption axis thereof is in parallel with linearly polarized light and so that it is perpendicular to linearly polarized light. That is, the spectral transmittance $k_1(\lambda)$ in the parallel direction and the spectral transmittance $k_2(\lambda)$ in the perpendicular direction are measured. Using the measured values, the single transmittance Ty, the parallel transmittance Tp, and the perpendicular transmittance Tc are calculated from expressions (V), (VII), and (VIII), and the degree of polarization Py is further calculated from expression (IX).

The parallel hue and the perpendicular hue are calculated using the parallel spectral transmittance Tp($\lambda$) and the perpendicular spectral transmittance Tc($\lambda$) obtained from expressions (III) and (VI) according to JIS Z 8729, and the resultant values are displayed on L*a*b* chromaticity coordinates. The neutral coefficient Np is calculated from expression (I) using a* and b* in the parallel hue (Pa* and Pb*) and a* and b* in the perpendicular hue (Qa* and Qb*). Also, $[(Pb*)^2+(Pb*)^2]^{0.5}$ (=A) as the basis of expression (II) is calculated from a* and b* in the parallel hue (Pa* and Pb*). The single transmittance for the wavelength of 380 nm is calculated from expression (VI) using $k_1$(380 nm) and $k_2$(380 nm).

(2) Hue of liquid crystal display screen

Polarizing plates bonded to a reflective TN mode liquid crystal display (LCD) of a commercially available calculator are peeled off, to obtain the remaining LCD cell. The polarizing plates manufactured according to the present invention are bonded to both surfaces of the LCD cell with an acrylic adhesive. The initial axial angle of the polarizing plate is adopted for this bonding. A reflector (AR grade) manufactured by Sumitomo Chemical Co., Ltd. is bonded to the surface of the rear polarizing plate opposite to the LCD cell with an acrylic adhesive. The resultant LCD with new polarizing plates is turned on, to visually observe the hue in the case of white display and in the case of black display.

Example 1

The following dyeing bath and boric acid treatment bath were prepared.

Dyeing bath: An aqueous solution containing 0.04 parts by weight of iodine and 5 parts by weight of potassium iodide per 100 parts by weight of water.

Boric acid treatment bath: An aqueous solution containing 9.5 parts by weight of boric acid and 8 parts by weight of potassium iodide per 100 parts by weight of water.

A polyvinyl alcohol film having a thickness of 75 $\mu$m, a degree of polymerization of 2,400, and a degree of saponification of 99.9% or more was uniaxially stretched to five times of the original size in the dry state. The stretched film kept in the tense state was immersed in the dyeing bath described above at a temperature of 28° C. for 80 seconds. While kept in the tense state, the film was then immersed in the boric acid treatment bath described above at a temperature of 76° C. for 240 seconds. Upon completion of the boric acid treatment, the film was washed with 35° C. pure water for 20 seconds. The water-washed film kept in the tense state was dried at 50° C. for 300 seconds, to obtain an iodine-type polarizing film.

An adhesive composed of a 5% aqueous solution of completely saponified polyvinyl alcohol was applied to both surfaces of the thus-obtained polarizing film. To each of the adhesive-applied surfaces of the polarizing film, bonded was a protection film having a thickness of 80 $\mu$m made of triacetyl cellulose containing an ultraviolet absorbent, the surface of which was saponified ("UV80" manufactured by Fuji Photo Film Co., Ltd.). The bonded film was dried at 50° C. for five minutes, to complete a polarizing plate. The transmittance for the wavelength of 380 nm of the resultant polarizing plate was 0.06%. The polarizing plate was measured for the single transmittance Ty, the degree of polarization Py, L*, a*, and b* in the parallel hue, and L*, a*, and b* in the perpendicular hue. Also calculated were the neutral coefficient Np and $[(Pb*)^2+(Pb*)^2]^{0.5}$ (=A) as the basis of the expression (II). The results of these measurements are shown in Table 1. The hue of the screen of a liquid crystal display using the polarizing plate obtained in this example is shown in Table 2.

Example 2

A polarizing plate was manufactured in the same manner as that described in Example 1, except that a triacetyl cellulose film containing no ultraviolet absorbent having a thickness of 50 $\mu$m ("SH50" manufactured by Fuji Photo Film Co., Ltd.) was used as the protection film. The single transmittance for 380 nm of the resultant polarizing plate was 38.76%. The polarizing plate was evaluated as described in Example 1, and the results are shown in Table 1. The hue of the screen of a liquid crystal display using the polarizing plate obtained in this example is shown in Table 2.

Example 3

A polarizing plate was manufactured in the same manner as that described in Example 1, except that a high-concentration iodine aqueous solution having a weight ratio of iodine/potassium iodide/water of 1:1.4:20 was added to the dyeing bath until the single transmittance of the polarizing plate was about 43.0%. The single transmittance for 380 nm of the resultant polarizing plate was 0.11%. The polarizing plate was evaluated as described in Example 1, and the results are shown in Table 1. The hue of the screen of a liquid crystal display using the polarizing plate obtained in this example is shown in Table 2.

Example 4

A polarizing plate was manufactured in the same manner as that described in Example 1, except that after the bonding of the triacetyl cellulose protection film, the bonded film was dried at 40° C. for 15 seconds, at 50° C. for 90 seconds, at 55° C. for 90 seconds, and then at 72° C. for 60 seconds. The single transmittance for 380 nm of the resultant polarizing plate was 0.09%. The polarizing plate was evaluated as described in Example 1, and the results are shown in Table 1. The hue of the screen of a liquid crystal display using the polarizing plate obtained in this example is shown in Table 2.

Comparative Example 1

A polarizing plate was manufactured in the same manner as that described in Example 1, except that a boric acid treatment bath having the following composition was used.

Boric acid treatment bath: An aqueous solution containing 9.5 parts by weight of boric acid and 2 parts by weight of potassium iodide per 100 parts by weight of water.

The single transmittance for 380 nm of the resultant polarizing plate was 0.28%. The polarizing plate was evaluated as described in Example 1, and the results are shown in Table 1. The hue of the screen of a liquid crystal display using the polarizing plate obtained in this comparative example is shown in Table 2.

Comparative Example 2

A polarizing plate was manufactured in the same manner as that described in Example 1, except that the drying temperature after the bonding of the protection film was 73° C. The single transmittance for 380 nm of the resultant polarizing plate was 0.09%. The polarizing plate was evaluated as described in Example 1, and the results are shown in Table 1. The hue of the screen of a liquid crystal display using the polarizing plate obtained in this comparative example is shown in Table 2.

TABLE 1

| No. | Ty (%) | Py (%) | Parallel hue | | | Perpendicular hue | | | Np | A |
|---|---|---|---|---|---|---|---|---|---|---|
| | | | L* | a* | b* | L* | a* | b* | | |
| Example 1 | 44.02 | 99.89 | 68.54 | −1.67 | 3.51 | 0.37 | 0.69 | −3.40 | 0.42 | 3.9 |
| Example 2 | 43.89 | 99.89 | 68.38 | −1.32 | 2.66 | 0.39 | 0.49 | −2.79 | 0.14 | 3.0 |
| Example 3 | 43.27 | 99.97 | 67.60 | −1.66 | 2.72 | 0.12 | 0.62 | −1.81 | 1.27 | 3.2 |
| Example 4 | 43.82 | 99.88 | 68.28 | −1.78 | 3.68 | 0.42 | 0.61 | −3.52 | 0.52 | 4.1 |
| Comparative example 1 | 44.35 | 99.16 | 68.76 | −1.62 | 2.25 | 2.98 | 9.21 | −26.10 | 24.9 | 2.8 |
| Comparative example 2 | 43.88 | 99.95 | 68.38 | −2.21 | 4.89 | 0.18 | 0.36 | −1.63 | 3.70 | 5.4 |

Ty: Single transmittance
Py: Degree of polarization
Np: Neutral coefficient
$A = [(Pa^*)^2 + (Pb^*)^2]^{0.5}$

TABLE 2

| | Hue of liquid crystal display screen | |
|---|---|---|
| | White display | Black display |
| Example 1 | neutral white | neutral black |
| Example 2 | neutral white | neutral black |
| Example 3 | neutral white | neutral black |
| Example 4 | neutral white | neutral black |
| Comparative example 1 | neutral white | bluish black |
| Comparative example 2 | yellowish white | neutral black |

As described above, when the polarizing plate of the present invention is applied to a liquid crystal display device, neutral white in the case of white display and neutral black in the case of black display are obtained, and thus good visibility is provided. In addition, bright white display and high contrast display are attained.

What is claimed is:

1. An iodine-type polarizing plate comprising a uniaxial stretched polyvinyl alcohol resin film with iodine adsorbed thereto in an oriented state and a protection film bonded to at least one surface of said resin film, wherein the polarizing plate has a single transmittance of about 42.5% or more, a degree of polarization of about 99% or more, and a neutral coefficient Np of 0 to about 4 which is calculated from the following expression (I), and the polarizing plate satisfies the relationship represented by the following expression (II);

$$Np = |\sqrt{(Pa^*)^2+(Pb^*)^2} - \sqrt{(Qa^*)^2+(Qb^*)^2}| \qquad (I)$$

wherein Pa*, Pb*, Qa*, and Qb* respectively denote a* and b* in a parallel hue and a* and b* in a perpendicular hue in L*a*b* color system;

$$\sqrt{(Pa^*)^2+(Pb^*)^2} < 4.5 \qquad (II).$$

2. The polarizing plate according to claim 1, wherein the single transmittance is about 43.5% or more.

3. The polarizing plate according to claim 1, wherein the degree of polarization is about 99.8% or more.

4. The polarizing plate according to claim 1, wherein the neutral coefficient Np is about 2 or less.

5. The polarizing plate according to claims 1, 2, 3 or 4, wherein the single transmittance for a wavelength of 380 nm is about 1% or less.

* * * * *